United States Patent [19]

Momii et al.

[11] 4,420,979

[45] Dec. 20, 1983

[54] ULTRASONIC MICROSCOPE

[75] Inventors: Isao Momii, Yunotani; Noriyoshi Chubachi; Junichi Kushibiki, both of Sendai, all of Japan

[73] Assignee: Olympus Optical Company Ltd., Japan

[21] Appl. No.: 370,062

[22] Filed: Apr. 20, 1982

[30] Foreign Application Priority Data

Apr. 21, 1981 [JP] Japan .............................. 56-59995

[51] Int. Cl.[3] .............................. G01N 29/00

[52] U.S. Cl. .............................. 73/644; 73/606

[58] Field of Search .............................. 73/606, 644

[56] References Cited

PUBLICATIONS

Performance of Sputtered $SiO_2$ Film as Acoustic Antireflection Coating at Sapphire/Water Interface by Kushibiki et al., from Electronics Letters, Sep. 11, 1980, vol. 16 No. 19, pp. 737–738.

*Primary Examiner*—Howard A. Birmiel

*Attorney, Agent, or Firm*—Ostrolenk, Faber, Gerb & Soffen

[57] ABSTRACT

An ultrasonic microscope is formed with an impedance matching layer composed of a chalcogenide glass film on a spherical lens portion of an ultrasonic condensing lens which contacts with an acoustic field medium.

12 Claims, 4 Drawing Figures

ULTRASONIC MICROSCOPE

BACKGROUND OF THE INVENTION

The invention relates to an ultrasonic microscope having an optimum impedance matching layer for use.

It has long been known to observe the microscopic structure of a substance using ultrasonic waves in lieu of light rays. To this end, ultrasonic microscopes scan a specimen surface mechanically with ultra-high frequency-ultrasonic wave beams, convert the ultrasonic waves scattered by the specimen into electrical signals by concentrating the scattered waves and display the signals on a display plane of a cathode-ray tube in two dimensions so that a microscope image can be obtained. In construction, ultrasonic microscopes are divided into two types: the transmission type and the reflection type depending on how the ultrasonic waves are detected. In the transmission type, ultrasonic waves are transmitted through a specimen undergoing scattering or attenuation and are then detected. In the reflection type, ultrasonic waves are reflected by the difference in acoustic properties inside the specimen and are then detected.

In the accompanying drawings, FIG. 1 is a diagram explaining a principle of the reflection type ultrasonic microscope. As shown, a signal from a high frequency oscillator 1 is applied to a transmitting and receiving transducer 3 by a directional coupler 2. This signal is converted into ultrasonic waves and these waves are radiated from one surface of an ultrasonic condensing lens 4 which transmits and receives them. The lens 4 is composed of an ultrasonic propagation medium such as sapphire and is attached to the transducer 3, at the inside of the ultrasonic condensing lens 4. The other surface of the ultrasonic condensing lens 4 forms a spherical lens portion 4*a* opposite to which a specimen holding plate 5 is disposed. An acoustic field medium 6 composed of water is interposed between the ultrasonic condensing lens 4 and the holding plate 5 and a specimen 7 is mounted on the plate 5 at the focus of the spherical lens portion 4*a*. The holding plate 5 is moved in the X-Y directions by a scanning unit 8 which is controlled by a scanning circuit 9. The ultrasonic waves incident on the ultrasonic condensing lens 4 from the transducer 3 are focused on the specimen 7. The ultrasonic waves reflected by the specimen 7 are gathered by the condensing lens 4 and inverted into an electrical signal by the transducer 3 so that the electrical signal is fed through the directional coupler 2 to a display unit 10.

However, as shown in FIGS. 2 and 3, as a practical matter the signals appearing on the display unit 10 are not only a signal indicated by (c) which is reflected by the specimen 7 but also a signal (a) which is produced by leakage waves from the directional coupler 2 and the transducer 3 and a signal ($b_1$) reflected by the boundary surface of the spherical lens portion 4*a* of the condensing lens 4, its second reflection signal ($b_2$) thereby, its third reflection signal ($b_3$), its fourth reflection signal ($b_4$) and so on which are picked up as the electrical signals by the transducer 3.

This fact indicates that only a part of the generated ultrasonic energy is utilized effectively and also the increase of the reflected waves within the condensing lens 4 deteriorates the signal-to-noise ratio of the signal from the specimen 7.

It is to be noted that the occurrence of reflection at the boundary surface of the spherical lens portion 4*a* of the condensing lens 4 is due to the discontinuity between the acoustic impedances of the material of the condensing lens 4 and the acoustic field medium 6. It is well known that the prevention against the above-mentioned fact is to provide an impedance matching layer on the spherical lens portion 4*a*. The optimum acoustic impedance $Z_M$ for the matching layer is expressed by the following formula: $Z_M = \sqrt{Z_1 . Z_2}$ where $Z_1$ is an acoustic impedance of the condensing lens 4 and $Z_2$ is the acoustic impedance of the acoustic field medium 6. It is possible to prevent the reflection at the boundary surface by selecting a material having the optimum acoustic impedance and forming the impedance matching layer of the thickness of $\lambda/4$ ($\lambda$ is a wavelength of the acoustic wave passing through the matching layer) between the spherical lens portion 4*a* and the acoustic field medium 6.

However, it is difficult in practice to obtain a material having the optimum acoustic impedance and therefore materials comparatively close to it are presently selected. By way of example, when sapphire is used as the material for the condensing lens 4 and water is used as the acoustic medium 6, the acoustic impedance of the optimum matching layer is $8.19 \times 10^6$ kg.m$^{-2}$.S$^{-1}$. Such a material can not, however, be obtained as a simple substance. While $SiO_2$ is used in practice as a material close to the value of the acoustic impedance as shown above, the acoustic impedance for $SiO_2$ is $13.14 \times 10^6$ kg.m$^{-2}$.S$^{-1}$, which is impossible to form a proper matching layer.

SUMMARY OF THE INVENTION

It is an object of the present invention, in view of the foregoing, to provide an ultrasonic microscope utilizing a material in which an acoustic impedance thereof is controllable in a wide range and its optimum value is selectable therefrom for the combination of an ultrasonic condensing lens and an acoustic field medium both composed of various kinds of materials.

DESCRIPTION OF PREFERRED EMBODIMENTS

Figure 1:
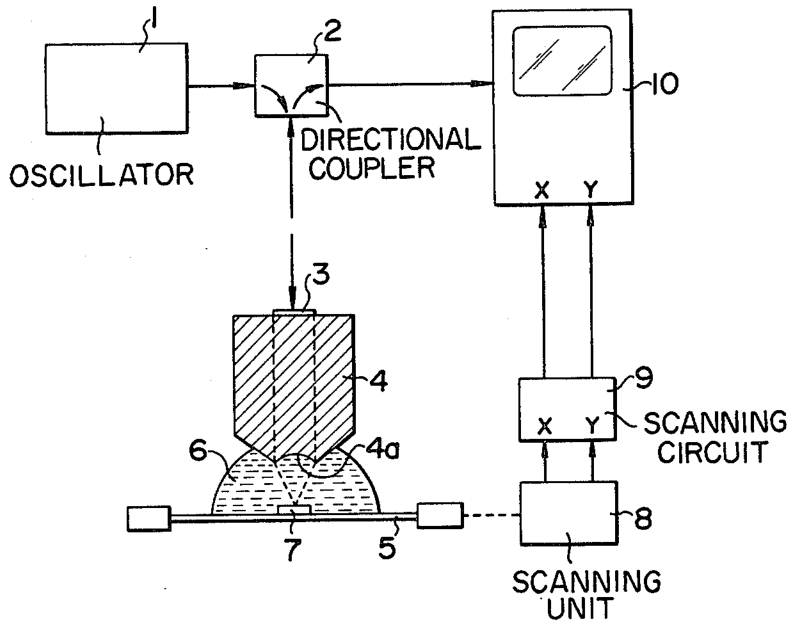
F I G. 1 (PRIOR ART)
FIG. 1 is a diagram for describing the principle of an ultrasonic microscope in the prior art.
Figure 2:
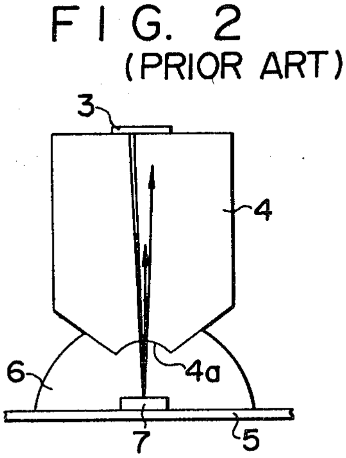
F I G. 2 (PRIOR ART)
FIG. 2 is a diagram describing the relation between an ultrasonic condensing lens and a specimen.
Figure 3:
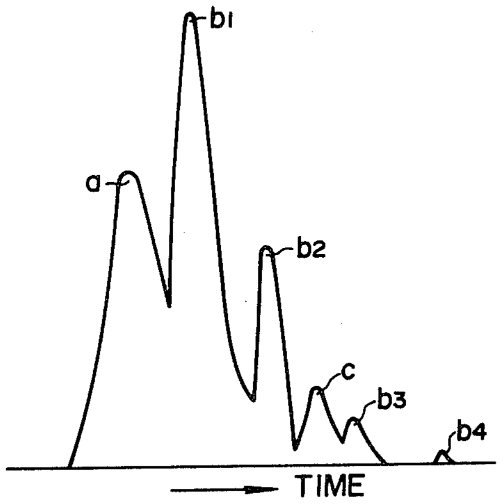
F I G. 3 (PRIOR ART)
FIG. 3 is a diagram showing output wave forms of reflected signals and a signal from the specimen.
Figure 4:
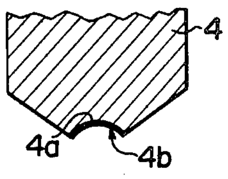
FIG. 4 is a sectional view showing an impedance matching layer on a spherical lens portion of an ultrasonic condensing lens according to the present invention.

The present invention will be described hereinafter, with reference to FIG. 4, in which a compound of As-S, As-Se or As-S-Se is applied to a spherical lens portion 4*a* of an ultrasonic condensing lens 4 by a process such as a vacuum evaporation and forms a chalcogenide glass film thus formed as an impedance matching layer 4*b* in which the undesired reflection at the boundary surface of the spherical lens portion 4*a* can be prevented. That is, it permits the free selection of acoustic impedance value by changing the composition ratios among three components of As, S and Se. The description for examples of the chalcogenide glass films will now be given with reference to Table 1. As shown, nine kinds of compounds different in composition ratios among As, S and Se components are prepared and these compounds are melted respectively in a quartz crucible and are applied to the surface of a sapphire rod by an evaporation process in a vacuum of 1 to $3\times10^{-5}$ Torr so as to form a chalcogenide glass film. In this case the film forming speed is 1 to 1.5 μm/min and it is found that the chalcogenide glass film thus formed is in the amorphous state by the examination of an X-ray analysis.

TABLE 1

| Example | Composition ratio (%) As | S | Se | Acoustic impedance $\times 10^6(kg \cdot m^{-2} \cdot S^{-1})$ |
|---|---|---|---|---|
| 1 | 40 | 0 | 60 | 9.30 |
| 2 | 40 | 30 | 30 | 8.44 |
| 3 | 40 | 40 | 20 | 7.99 |
| 4 | 40 | 60 | 0 | 7.27 |
| 5 | 34 | 66 | 0 | 7.06 |
| 6 | 29 | 71 | 0 | 6.91 |
| 7 | 24 | 76 | 0 | 6.55 |
| 8 | 20 | 80 | 0 | 6.08 |
| 9 | 16 | 84 | 0 | 5.53 |

Percentages in the foregoing table are on an atomic (MOL) basis. The results of the measurement of the acoustic impedance for these chalcogenide glass films by the well known pulse-echo method are as indicated in the right column of Table 1. According to these figures, the range of acoustic impedances is from $5.53\times10^6$ kg.m$^{-2}$.S$^{-1}$ to $9.30\times10^6$ kg.m$^{-2}$.S$^{-1}$ depending upon the composition ratios of the three components. Further, it is proved that the range from $4\times10^6$ kg.m$^{-2}$.S$^{-1}$ to $15\times10^6$ kg.m$^{-2}$.S$^{-1}$ of acoustic impedances, which is not shown in Table 1, is obtainable by changing the composition ratios. Therefore, it is to be understood that a matching layer having the optimum acoustic impedance can be obtained for the combination of ultrasonic condensing lens 4 and ultrasonic field medium 6, both composed of various kinds of materials, not to mention the combination of the condensing lens 4 made of sapphire and the acoustic field medium 6 of water.

As described in the foregoing, according to the present invention the impedance matching layer 4*b* composed of the chalcogenide glass film is formed on the spherical lens portion 4*a* of the ultrasonic condensing lens 4, permitting an easy selection of the material having the optimum acoustic impedance and thus preventing the reflection at the boundary surface between the condensing lens 4 and the acoustic field medium 6. Thus the signal to noise ratio of signals from the specimen 7 is advantageously improved.

It is to be noted that the impedance matching layer 4*b* can be formed by a spattering process and the like other than an evaporation process.

What is claimed is:

1. An ultrasonic microscope comprising an impedance matching layer composed of a chalcogenide glass film, said layer being on a spherical lens portion of an ultrasonic condensing lens which contacts with an acoustic field medium.

2. An ultrasonic microscope according to claim 1 in which the impedance matching layer is formed with a chalcogenide glass film selected from the one having an acoustic impedance in the range between $5.53\times10^6$ kg.m$^{-2}$.S$^{-1}$ and $9.30\times10^6$ kg.m$^{-2}$.S$^{-1}$.

3. An ultrasonic microscope according to claim 2 in which the chalcogenide glass film is formed by melting a compound of three components of As, S and Se in a quartz crucible and in which the film is applied to the lens portion in a vacuum.

4. An ultrasonic microscope according to claim 2 in which the impedance matching layer is formed with the chalcogenide glass film having a composition ratio of 40% As, on an atomic (MOL) basis and 60% Se.

5. An ultrasonic microscope according to claim 2 in which the impedance matching layer is formed with the chalcogenide glass film having a composition ratio of 40% As, 30% S and 30% Se on an atomic (MOL) basis.

6. An ultrasonic microscope according to claim 2 in which the impedance matching layer is formed with the chalcogenide glass film having a composition ratio of 40% As, 40% S and 20% Se on an atomic (MOL) basis.

7. An ultrasonic microscope according to claim 2 in which the impedance matching layer is formed with the chalcogenide glass film having a composition ratio of 40% As, and 60% S on an atomic (MOL) basis.

8. An ultrasonic microscope according to claim 2 in which the impedance matching layer is formed with the chalcogenide glass film having a composition ratio of 34% As, and 66% S on an atomic (MOL) basis.

9. An ultrasonic microscope according to claim 2 in which the impedance matching layer is formed with the chalcogenide glass film having a composition ratio of 29% As, and 71% S on an atomic (MOL) basis.

10. An ultrasonic microscope according to claim 2 in which the impedance matching layer is formed with the chalcogenide glass film having a composition ratio of 24% As, and 76% S on an atomic (MOL) basis.

11. An ultrasonic microscope according to claim 2 in which the impedance matching layer is formed with the chalcogenide glass film having a composition ratio of 20% As, and 80% S on an atomic (MOL) basis.

12. An ultrasonic microscope according to claim 2 in which the impedance matching layer is formed with the chalcogenide glass film having a composition ratio of 16% As, and 84% S on an atomic (MOL) basis.

* * * * *